United States Patent
Maurer

(10) Patent No.: US 6,725,066 B2
(45) Date of Patent: Apr. 20, 2004

(54) METHOD OF CANCELLING ECHOES IN A TELECOMMUNICATIONS SYSTEM AND AN ECHO CANCELLER FOR THE EXECUTION OF THE METHOD

(75) Inventor: Michael Maurer, Waiblingen (DE)

(73) Assignee: Alcatel, Paris (FR)

(*) Notice: Subject to any disclaimer, the term of this patent is extended or adjusted under 35 U.S.C. 154(b) by 615 days.

(21) Appl. No.: 09/730,582

(22) Filed: Dec. 7, 2000

(65) Prior Publication Data

US 2001/0003705 A1 Jun. 14, 2001

(30) Foreign Application Priority Data

Dec. 14, 1999 (DE) .......................... 199 60 051

(51) Int. Cl.[7] .................................. H04B 1/38
(52) U.S. Cl. ............. 455/570; 455/569.1; 379/406.01; 379/406.1; 370/286; 370/292; 381/71.8
(58) Field of Search ................ 455/569.1, 570; 379/406.01, 406.1; 370/286, 292; 381/71.8

(56) References Cited

U.S. PATENT DOCUMENTS

| | | | | |
|---|---|---|---|---|
| 4,562,312 A | * | 12/1985 | Duttweiler | 370/290 |
| 4,577,309 A | | 3/1986 | Barazeche et al. | |
| 4,645,884 A | * | 2/1987 | Barazeche et al. | 379/406.01 |
| 4,965,823 A | * | 10/1990 | Nakagawa et al. | 379/406.08 |
| 5,737,410 A | * | 4/1998 | Vahatalo et al. | 379/406.08 |
| 6,044,068 A | * | 3/2000 | El Malki | 370/286 |
| 6,061,444 A | * | 5/2000 | Kawahara et al. | 379/406.08 |

FOREIGN PATENT DOCUMENTS

| | | |
|---|---|---|
| EP | 0 300 352 A1 | 1/1989 |
| EP | 0 592 787 B1 | 12/1998 |
| EP | 0 998 110 A2 | 5/2000 |

* cited by examiner

*Primary Examiner*—William Trost
*Assistant Examiner*—Danh C Le
(74) *Attorney, Agent, or Firm*—Sughrue Mion, PLLC

(57) ABSTRACT

A method of canceling echoes in a telecommunications system wherein an exchange of information takes place between a local subscriber and a subscriber at the remote end of a transmission link and at least one subscriber is assigned an echo canceller, the parameters of which are set as a function of an echo delay time (i). The signs of the signal x(t) transmitted by a subscriber and the signal y(t) received by the subscriber can be determined at equidistant time intervals ($T_i$) so that sign sequences arise which are stored and compared with one another, and in the event of a direct correspondence or a correspondence as a result of an inversion of the sign sequences of the received signal y(t) and of the transmitted signal x(t) the received signal y(t) is detected as an echo and the echo delay time (i) is calculated.

4 Claims, 2 Drawing Sheets

METHOD OF CANCELLING ECHOES IN A TELECOMMUNICATIONS SYSTEM AND AN ECHO CANCELLER FOR THE EXECUTION OF THE METHOD

BACKGROUND OF THE INVENTION

The invention relates to a method of cancelling echoes in a telecommunications system wherein an exchange of information takes place between a local subscriber and a subscriber at the remote end of a transmission link and at least one subscriber is assigned an echo canceller, the parameters of which are set i.a. as a function of an echo delay time, and to an echo canceller for the execution of the method.

Disturbing echoes, so-called line echoes, occur due to undesired electric coupling between a receiving path and a transmitting path. In modern communications technology such couplings or echoes, caused by data reductions, junctions, frequent 2-wire/4-wire transitions etc., constitute an increasing problem. Therefore echo-cancelling measures, such as NLMS algorithms or compander algorithms, are used to improve the quality of speech- or data connections. In the case of these algorithms it is often useful to have knowledge of the delay time of the echo signals. To determine the echo delay time it must be ascertained when the transmitted signal arrives at the echo reception location. As telecommunications systems are generally operated bidirectionally, the echo signal can be superimposed with a signal fed-in at the remote end of the transmission link as useful signal. This occurs whenever speech takes place simultaneously at both ends of the transmission link. This is the so-called double talk situation. It is a general problem in all possible transmission situations to clearly identify an echo and distinguish it from useful signals in the double talk situation.

DE-A-42 29 0110 has disclosed a method of detecting an echo in which the transmitted signal is recorded and compared with the signal incoming at the reception location. For this purpose a correlation analysis is performed, in which the degree of correlation indicates the probability as to whether an echo or a mixed signal, produced by the double talk, is present. This decision is made by a threshold value. The greater the selected threshold value, the less often are existing echoes detected. False decisions therefore frequently occur. If on the other hand the threshold value is selected too low, the danger exists that useful signals will be filtered out in double talk. The computation outlay for the correlation analysis is very high while the echo detection reliability is unsatisfactory.

Additionally, DE-A-19 85 0272 has disclosed a method of detecting an echo wherein local extreme values are determined from the transmitted signal and the received signal. As the time difference between two local extreme values is dependent upon the curve formation of the transmitted signal, in the case of an echo the same time difference between consecutive extreme values occurs for the transmitted signal and the received signal. These extreme values are marked with a pulse, thereby giving rise to pulse trains which represent a characteristic of a speech sequence. A measure of the similarity is derived from the pulse train of the local extreme values of the transmitted signal and of the received signal. This method requires a high signal processing outlay, using similarity criteria to make a decision about the echo characteristic of a signal. The decision reliability is consequently relatively poor.

SUMMARY OF THE INVENTION

The object of the invention is to improve the reliability of the echo detection whilst endeavouring to achieve as low as possible a storage and computation outlay.

The signal received by the subscriber are determined at equidistant time intervals, so that sign sequences arise which are stored and compared with one another, and that in the event of a direct correspondence or a correspondence as a result of inversion of the sign sequences of the received signal and of the transmitted signal, the received signal is detected as an echo and the echo transmission time is calculated. In this way it is possible to make a very reliable decision as to whether an echo signal or a mixed signal is present without taking into account similarity criteria. The decision reliability is the better, the smaller the selected equidistant time intervals for the sign determination. For example a signal curve of the transmitted signal characterised by the following blocks can occur: 23 times positive sign, 40 times negative sign, 51 times positive sign, 24 times negative sign. Only when precisely this block classification is determined either exactly or in inverted form also for the received signal, is an echo signal present.

To determine the echo delay time from a determined correspondence of this type, it is provided that the time offset of the sign sequences and of the corresponding signal blocks is determined.

In accordance with an advantageous further development, the sign sequences of the transmitted signals are determined during a fixed time interval. This time interval is selected such that a sufficient number of signs for the unequivocal characterisation of the signal curve of the transmitted signal can occur within it. For example on average the time interval can comprise five sign blocks, the blocks being redetectably characterised by a sufficient number of sign determinations. In the event of a restriction to approximately five sign blocks, during this time interval at least one hundred sign determinations are to take place, i.e. the time interval is to amount to at least one hundred times the equidistant time interval between two sign determinations. The sign sequences of the received signals are determined during the maximum echo delay time. In this way, in spite of a reduced outlay, a reliable identification of echo signals occurs. A calculation of the echo delay time as a precondition of the echo cancellation naturally only takes place if the received signal exceeds a fixed threshold above the reception noise. After a delay time measurement, no further delay time measurement is to occur until the transmitted signal breaks off. The determination of the next sign sequence during the fixed time interval is not initiated until the commencement of the next speech-specific transmitted signal.

An echo canceller for the execution of the method. Means are provided for determining the sign sequences, as well as comparison means and a counter for determining the time offset between sign sequences which correspond directly or as a result of inversion, where the time offset forms a measure of the echo delay time.

BRIEF DESCRIPTION OF THE DRAWINGS

In the following the invention will be explained in detail making reference to the Figures of the drawing wherein.

DETAILED DESCRIPTION OF THE INVENTION

Figure 1:
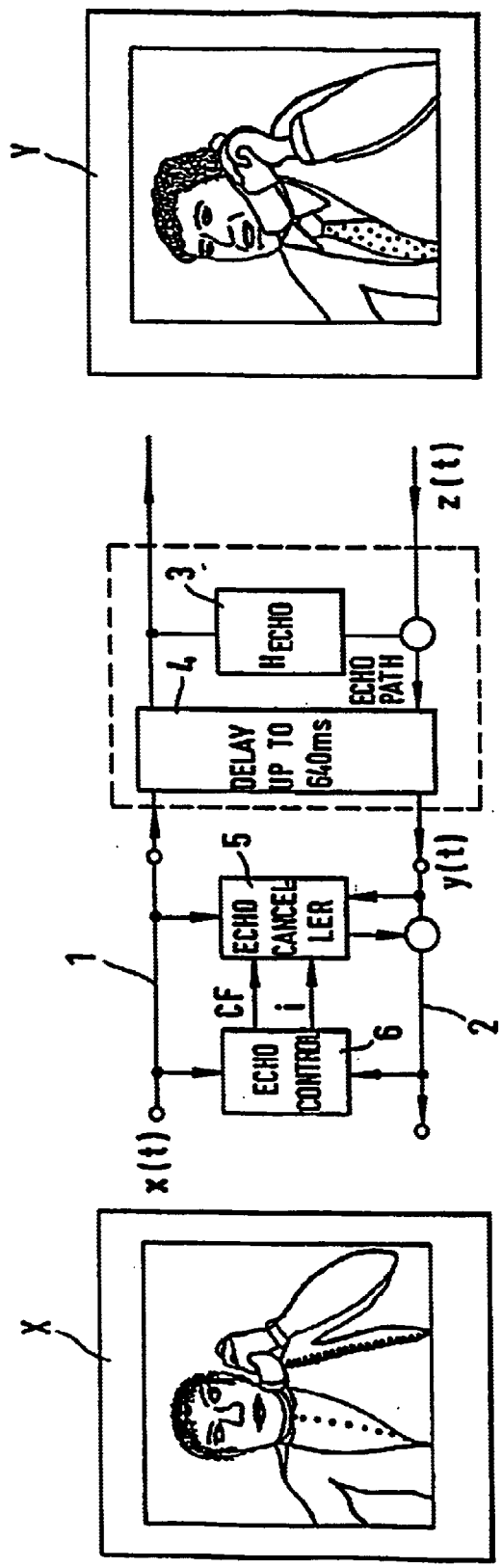
FIG. 1 is a general diagram of a transmission link affected by an echo.

To explain the factual situation, FIG. 1 shows a local subscriber X who is connected via a transmitting path 1 and a receiving path 2 to a subscriber Y at the remote end of the transmission link. The properties of the transmission link are symbolised by an echo generator 3 and a delay element 4. The local subscriber X is assigned an echo canceller 5 for compensating detected echoes. The reference parameters for the echo canceller 5, namely the echo delay time i and the coupling factor CF, are set by a control circuit 6. The coupling factor CF indicates the ratio of the signal energy received at the echo reception location to the signal energy transmitted at the echo source.

Figure 2:
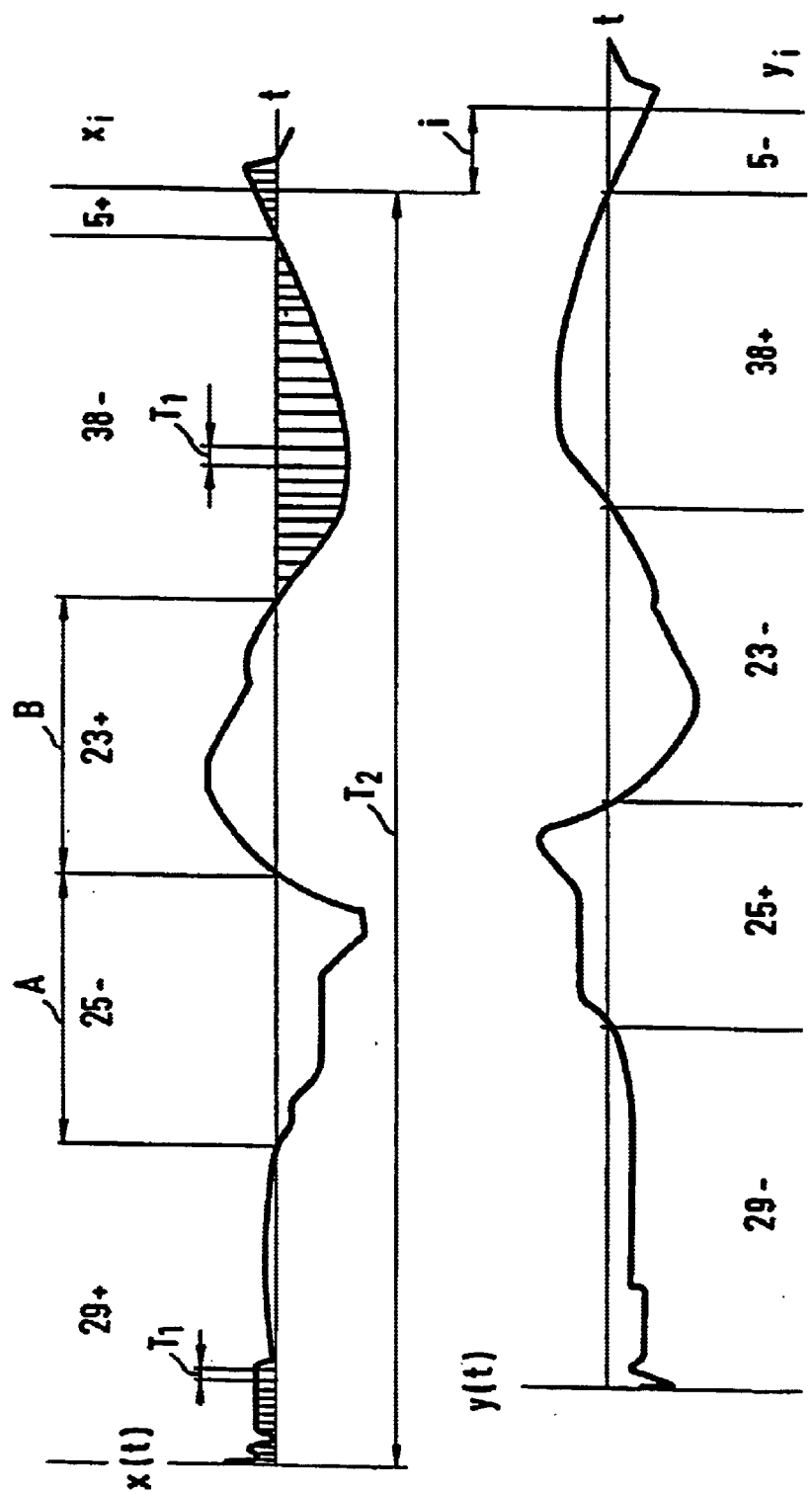
FIG. 2 shows time functions of a transmitted and a received signal in illustration of the method.

In FIG. 2 the upper curve represents a time function $x(t)$ of a speech signal of the local subscriber X and the lower curve represents the time function $y(t)$ of a signal received by the local subscriber X. It can be seen that the time function $y(t)$ constitutes an echo originating from the transmitted signal $x(t)$ which is rotated by 180° relative to the transmitted signal and is offset by an echo delay time i. For both time functions $x(t)$ and $y(t)$ the signs of individual curve points are determined at equidistant time intervals $T_1$. The determined signs are combined to form sign sequences $x_i$ of the transmitted signal $x(t)$ and $y_i$ of the received signal $y(t)$. These sign sequences $x_i$ and $y_i$ characterise the relevant length of sign-positive and sign-negative signal blocks, of which two have been referenced A and B. When precisely these blocks A, B recur in inverted form in the received signal $y(t)$, the received signal $y(t)$ is an echo signal. The delay time i of the echo signal results from the time offset between similar sign sequences $x_i$ and $y_i$ and can easily be determined with the aid of a counter. In the exemplary embodiment illustrated in FIG. 2, the sign sequence $x_i$ of the transmitted signal $x(t)$ is 29 plus, 25 minus, 23 plus, 38 minus, 5 plus. This sign sequence $x_1$ recurs in inverted form in the received signal $y(t)$.

Naturally the time curves $x(t)$ and $y(t)$ are evaluated in digitalized form so that sign bits are combined to form the sign sequences $x_i$ and $y_i$.

The invention is not limited to the above described exemplary embodiment. Rather, a number of variants are conceivable which utilize the features of the invention albeit in a basically different type of design.

What is claimed is:

1. A method of suppressing echoes in a telecommunications system wherein an exchange of information takes place between a local subscriber (X) and a subscriber (Y) at the remote end of a transmission link, and at least one subscriber (X) is assigned an echo canceller (5), the parameters of which are set i.a. as a function of an echo delay time, characterised in that the signs of the signal $(x(t))$ transmitted by a subscriber (X) and the signal $(y(t))$ received by the subscriber (X) are determined at equidistant time intervals $(T_1)$ so that sign sequences $(x_i, y_i)$ arise which are stored and compared with one another, and that in the event of a direct correspondence or a correspondence as a result of inversion $(x_i=y_i$ or $x_i=y_i)$ of the sign sequences $(x_i, y_i)$ of the received signal $(y(t))$ and of the transmitted signal $(x(t))$, the received signal $(y(t))$ is detected as an echo and the echo delay time (i) is calculated.

2. A method according to claim 1, characterised in that the echo delay time (i) is determined from the time offset of sign sequences $(x_i, y_i)$ which correspond directly or as a result of inversion.

3. A method according to claim 1, characterised in that the sign sequences $(x_i)$ of the transmitted signals $(x(t))$ are determined during a fixed time interval $(T_2)$, while the sign sequences $(y_i)$ of the received signals $(y(t))$ are determined during the maximum echo delay time.

4. An echo canceller (5) for executing the method according to claim 1, characterised by means for determining the sign sequences $(x_i, y_i)$ of transmitted signals $(x(t))$ and received signals $(y(t))$, comparison means for determining sign sequences $(x_1, y_1)$ which correspond directly or as a result of inversion and a counter for determining the time offset between sign sequences $(x_i, y_i)$ which correspond directly or as a result of inversion.

* * * * *